US012168233B1

(12) United States Patent
King

(10) Patent No.: US 12,168,233 B1
(45) Date of Patent: Dec. 17, 2024

(54) MICROTITER PLATE MIXING CONTROL SYSTEM

(71) Applicant: KING INSTRUMENTATION TECHNOLOGIES, Dayton, OH (US)

(72) Inventor: Edward E. King, Dayton, OH (US)

(73) Assignee: King Instrumentation Technologies, Dayton, OH (US)

( * ) Notice: Subject to any disclaimer, the term of this patent is extended or adjusted under 35 U.S.C. 154(b) by 179 days.

(21) Appl. No.: 17/658,744

(22) Filed: Apr. 11, 2022

Related U.S. Application Data

(62) Division of application No. 16/199,497, filed on Nov. 26, 2018, now Pat. No. 11,298,701.

(51) Int. Cl.

| | |
|---|---|
| ***B01L 3/00*** | (2006.01) |
| ***B01F 31/20*** | (2022.01) |
| ***B01F 35/214*** | (2022.01) |
| ***B01F 35/221*** | (2022.01) |
| *B01F 101/23* | (2022.01) |

(52) U.S. Cl.
CPC ............ *B01L 3/5085* (2013.01); *B01F 31/27* (2022.01); *B01F 35/214* (2022.01); *B01F 35/2214* (2022.01); *B01F 2101/23* (2022.01); *B01L 2300/0609* (2013.01); *B01L 2300/0663* (2013.01); *B01L 2300/0829* (2013.01); *B01L 2400/0409* (2013.01)

(58) Field of Classification Search
CPC ............................. B01F 31/27; B01F 2101/23
See application file for complete search history.

(56) References Cited

U.S. PATENT DOCUMENTS

| | | | |
|---|---|---|---|
| 1,241,450 | A | 9/1917 | Harold |
| 2,377,061 | A | 5/1945 | Zimmerman |
| 4,533,255 | A | 8/1985 | Gronholz |
| 5,814,232 | A | 9/1998 | Face, Jr. |
| 5,836,683 | A | 11/1998 | Moon |
| 6,283,626 | B1 | 9/2001 | Lim |
| 6,578,659 | B2 | 6/2003 | Manna |

(Continued)

FOREIGN PATENT DOCUMENTS

| | | |
|---|---|---|
| CN | 1241450 | 1/2000 |
| EP | 1318408 | 6/2003 |

(Continued)

OTHER PUBLICATIONS

ANSI/SLAS Jan. 2004; American National Standards Institute; Footprint Dimensions for Microplates; Oct. 12, 2011; 8 pages.

(Continued)

*Primary Examiner* — Natalia Levkovich
(74) *Attorney, Agent, or Firm* — Tuggle Duggins P.A.; Reinier R. Smit; Blake P. Hurt

(57) ABSTRACT

A microtiter plate mixing control system is disclosed. The system includes a frame, a suspension system attached to the frame, and a magnetically responsive horizontal platform supported on the frame by the suspension system. A solenoid is adjacent the platform for moving the platform on the suspension system. A proximity sensor is adjacent the platform for determining the position of the platform with respect to the frame. A controller is in communication with the proximity sensor and the solenoid for driving the solenoid and moving the platform in response to the proximity sensor.

13 Claims, 11 Drawing Sheets

(56) References Cited

U.S. PATENT DOCUMENTS

| | | | | |
|---|---|---|---|---|
| 7,980,752 | B2 | 7/2011 | Sarvazyan | |
| 8,662,739 | B2 | 3/2014 | Kaufmann | |
| 2001/0030906 | A1* | 10/2001 | Friedman | C12M 27/16 366/127 |
| 2002/0044495 | A1 | 4/2002 | Friedman | |
| 2006/0004920 | A1 | 1/2006 | Hallenbeck | |
| 2006/0013063 | A1 | 1/2006 | Singh | |
| 2006/0275883 | A1 | 12/2006 | Rathgeber | |
| 2008/0159062 | A1 | 7/2008 | Kaufmann | |
| 2008/0170463 | A1 | 7/2008 | Murakami | |
| 2012/0264233 | A1 | 10/2012 | Jansson | |

FOREIGN PATENT DOCUMENTS

| | | |
|---|---|---|
| EP | 1512975 | 3/2005 |
| EP | 1579914 | 9/2005 |
| EP | 1707957 | 10/2006 |
| EP | 1746316 | 1/2007 |
| EP | 1946843 | 7/2008 |
| EP | 1967857 | 9/2008 |
| EP | 2093571 | 8/2009 |
| EP | 2168675 | 3/2010 |
| EP | 2191897 | 6/2010 |
| EP | 2214010 | 8/2010 |
| EP | 2261650 | 12/2010 |
| EP | 2275810 | 1/2011 |
| EP | 2289616 | 3/2011 |
| EP | 2333387 | 6/2011 |
| EP | 2371942 | 10/2011 |
| EP | 2402460 | 1/2012 |
| EP | 2436444 | 4/2012 |
| EP | 2461156 | 6/2012 |
| EP | 2465609 | 6/2012 |
| EP | 2489433 | 8/2012 |
| EP | 2570187 | 3/2013 |
| EP | 2650009 | 10/2013 |
| EP | 2660482 | 11/2013 |
| EP | 2765423 | 8/2014 |
| WO | 2006004920 | 1/2006 |
| WO | 2006027602 | 3/2006 |

OTHER PUBLICATIONS

ANSI/SLAS Jan. 2004; American National Standards Institute; Height Dimensions for Microplates; Oct. 13, 2011; 9 pages.

John Comley, Microplate Mixing Bioassay Panacea or of Unproven Distraction? Drug Discovery World; Winter 2007; 12 pages.

Definitions of “horizontal”, “vertical”, and “plumb”, Lawrence Urdang and Stuart Berg Flexner, Editors, The Random House College Dictionary, 1972, Random House Inc.

* cited by examiner

MICROTITER PLATE MIXING CONTROL SYSTEM

This non-provisional utility patent application is a proper divisional of U.S. patent application Ser. No. 16/199,497. This non-provisional patent application claims all benefits under 35 U.S.C. § 121 of pending U.S. non-provisional patent application Ser. No. 16/199,497 filed Nov. 26, 2018, entitled "MICROTITER PLATE MIXING CONTROL SYSTEM", in the United States Patent and Trademark Office, which is incorporated by reference in its entirety herein.

BACKGROUND

The present invention relates to the precise control of fluids in small volumes, and in particular relates to the precise control of fluid mixing in sophisticated chemical reactions in such small volumes.

In many circumstances mixing is a relatively straightforward and well understood process. Physical agitation is applied to the components until they reach a desired condition, often a solution, dispersion, suspension, or emulsion, but sometimes a form such as a slurry.

In larger volumes, gravity, friction, viscosity, turbulence, container geometry, utensil shape, and available time may tend to dominate the mixing process.

In the context of small volumes, however, the factors that affect mixing change proportionally. In particular, forces such as viscosity, surface tension, and laminar flow become more dominant in small volumes and must be accounted for.

Mixing is important in many fields, but precise mixing of liquids in small volumes is particularly important in a number of areas of biology and chemistry such as analysis, screening, genetics, diagnostics, synthesis, and environmental monitoring.

The capability to efficiently mix small volumes enables multiple reactions to be carried out more rapidly and thus more cost-effectively. In other circumstances, biological and chemical reactions and testing ("assays") require multiple steps, many or all of which require mixing small volumes.

In some cases, the small volumes may be driven by the cost of materials, while in others, the small volume is determined by the desire to carry out a large number of almost similar but not identical reactions (e.g., combinatorial libraries) and in yet other circumstances the small volume is determined because the amount of (for example) a biological or chemical sample to be tested is quite limited.

As one example, PCR (polymerase chain reaction) amplification of DNA is often carried out in picogram (pg) or nanogram (ng) quantities in microliter (ul) volumes.

Within the field of small-volume reactions, the "microtiter plate" or "microplate" has become a fairly standard tool in many circumstances. Although the term "standard" does not represent every possibility, relevant organizations—e.g., the American National Standards Institute (ANSI) and the Society for Laboratory Automation and Screening (SLAS)—provide helpful guidelines and standard dimensions and definitions (www.slas.org/resources/information/industry-standards/; accessed Nov. 22, 2014).

Such standards allow plate manufacturers, manufacturers of automated plate handling equipment (particularly robotics), and end users, to make and use differently-sourced items conveniently and predictably. Thus, a microtiter plate that can conform to ANSI/SLAS standards is (for simple descriptive purposes) about 5 inches (128 mm) long, about 3.4 inches (85 mm) wide, and about 0.5 inches (14 mm) high. The plate contains 96 wells that have their positions and pitches (slope sides) defined by the ANSI/SLAS standards. The wells can hold between 100 and 200 μL of fluid.

Other standard plates include 384 wells or 1536 wells, in which case each well is proportionally quite smaller than the 96 well plate.

Because microtiter plates are used for reactions, in many circumstances reactant compositions must be (or should be) physically mixed in the wells in the small volumes used or available. Typical mixing devices for microtiter plates tend to use a rotational movement in which the plate is positioned on a horizontal platform and the platform is mechanically rotated or oscillated in the horizontal plane (i.e., parallel to the microtiter plate).

Such rotational mixing tends to be time-consuming and often requires adding a plate cover to prevent spilling and cross-contamination between and among wells. In turn, the plate covering step is typically carried out manually, thus defeating some of the automation advantages offered by a standardized plate. To the extent that plate-covering (and therefore cover-removing) steps can be carried out automatically, they require added structure with resultant associated inefficiencies and higher costs. At a minimum, because physical space is often at a premium in the laboratory context, additional mechanical devices compete for such premium space.

Published international application WO2006027602 explores the possibility of mixing within small droplets by generating a vibrational motion rather than a rotational one, and other disclosures (e.g., U.S. Pat. Nos. 7,980,752 and 6,578,659) attempt to use ultrasonic energy to mix small volumes in microtiter plates. U.S. Pat. No. 8,662,739 uses a side-to-side movement to attempt mixing.

Among end users, frequent concerns about microplate mixing include the invasive nature of some mechanical stirrers; the necessity of sealing plates in some circumstances; the heating effect of mixing which can activate or inactivate certain components in an undesired manner; problems with automation compatibility; the need for a large dead volume in the well; slow mixing times; overly aggressive or uncontrolled mixing; incompatibility with various microplate formats and materials; and large instrument footprints.

Therefore, a need exists for better mixing capabilities for small liquid volumes that are compatible with the requirements and advantages of microtiter plates in an automated context.

SUMMARY

In one aspect the invention is a microtiter plate mixing control system that includes a frame, a spring or other suspension system (i.e., capable of storing potential energy) attached to the frame, and a magnetically responsive horizontal platform supported for reciprocating vertical motion on the frame by the spring. A solenoid is adjacent the platform for moving the platform in the vertical axis on the spring, and a proximity sensor is adjacent the platform for determining the vertical position of the platform with respect to the frame. A controller is in communication with the proximity sensor and the solenoid for driving the solenoid and moving the platform in response to the proximity sensor.

In another aspect the invention is a mixing control system that includes an optical source and an optical sensor responsive to the source that together define an optical path that includes at least one plate well when a microtiter plate is on the magnetically responsive horizontal platform. The optical detector is in communication with the controller to provide the controller with information based upon the well's effect on optical transmissions between the optical source and the optical detector along the defined optical path.

In another aspect the invention is a method of mixing compositions in small volumes of liquids by positioning a microtiter plate containing compositions to be mixed on a suspension mounted horizontal platform, initiating resonant motion of the horizontal platform in the vertical axis on the suspension system, measuring the vertical position of the platform as the platform moves, and driving the vertical motion of the plate on the suspension system in response to the measured vertical position.

In another aspect the invention is a method of controlled mixing of compositions in small volumes of liquids by driving the resonant motion in the vertical axis of a horizontally oriented, microtiter plate in response to the inductively measured vertical position of the plate.

In another aspect the invention is a microtiter plate mixing control system comprising a microtiter plate on a moveable metal platform that can be magnetically driven, a proximity sensor adjacent the platform to identify the position of the platform, a solenoid responsive to the sensor to drive the platform, the plate, and any contents of the plate at a desired resonant frequency, and a microcontroller that receives input from the sensor and provides output to the solenoid.

In another aspect the invention is a method of mixing compositions in small volumes of liquids that includes the steps of positioning a microtiter plate containing compositions to be mixed on a suspension mounted horizontal platform, initiating resonant motion in the vertical axis of the horizontal platform on the suspension system, measuring the optical turbulence of the composition in at least one well in the microtiter plate, and driving the vertical motion of the plate on the suspension system in response to the optical turbulence.

The foregoing and other objects and advantages of the invention and the manner in which the same are accomplished will become clearer based on the followed detailed description taken in conjunction with the accompanying drawings.

DETAILED DESCRIPTION

Fundamentally, the invention provides the means to control the process of mixing compositions in a microtiter plate using precise vertical motion and precise frequency control.

The terms "horizontal" and "vertical" are used herein in their ordinary dictionary sense. Thus, as an example, the horizontal direction is parallel to level ground or parallel to the horizon. The vertical direction is perpendicular to the plane of the horizon and is sometimes referred to as "plumb" in the sense that a plumb line will always define the vertical direction. Lawrence Urdang and Stuart Berg Flexner, Editors, The Random House College Dictionary, 1972, Random House Inc.

Figure 1:
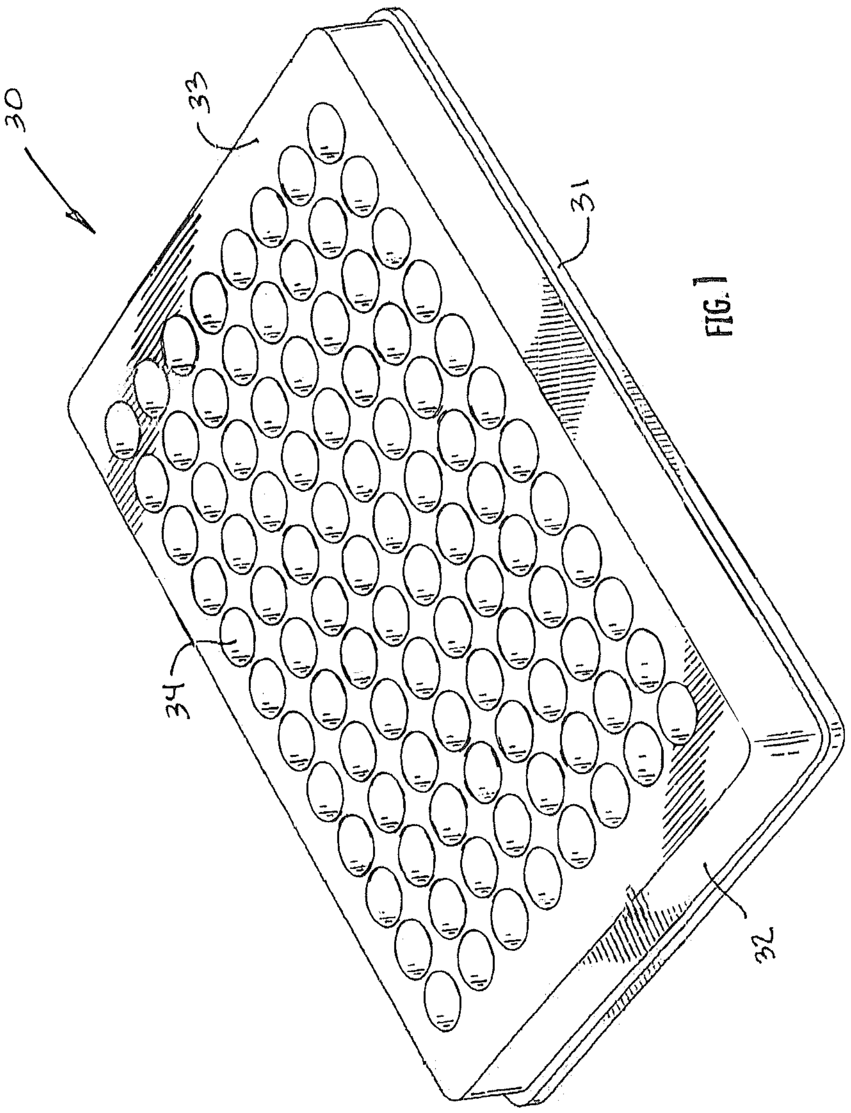
FIG. 1 is a perspective view of a microtiter plate of the type handled in the present invention.

FIG. 1 is a perspective view of an exemplary (but not limiting) microtiter plate broadly designated at 30. As set forth in the background, microtiter plates such as the illustrated plate 30 are frequently manufactured to precise shape and measurement standards so that they can be used in robotic environments (and so that robotics can be designed to handle them). Accordingly, the largest dimension of the plate is defined by a flanged base 31 upon which a perimeter wall 32 rises to form a top face 33. A plurality of wells 34 depend downwardly from the top face 33 towards the flanged base 31. In the generally standard context illustrated in FIG. 1, the plate includes 96 wells arranged as 12 columns of 8 wells each.

Fundamentally, the invention provides a greatly improved mixing (and thus reaction) capability within the wells 34.

Figure 2:
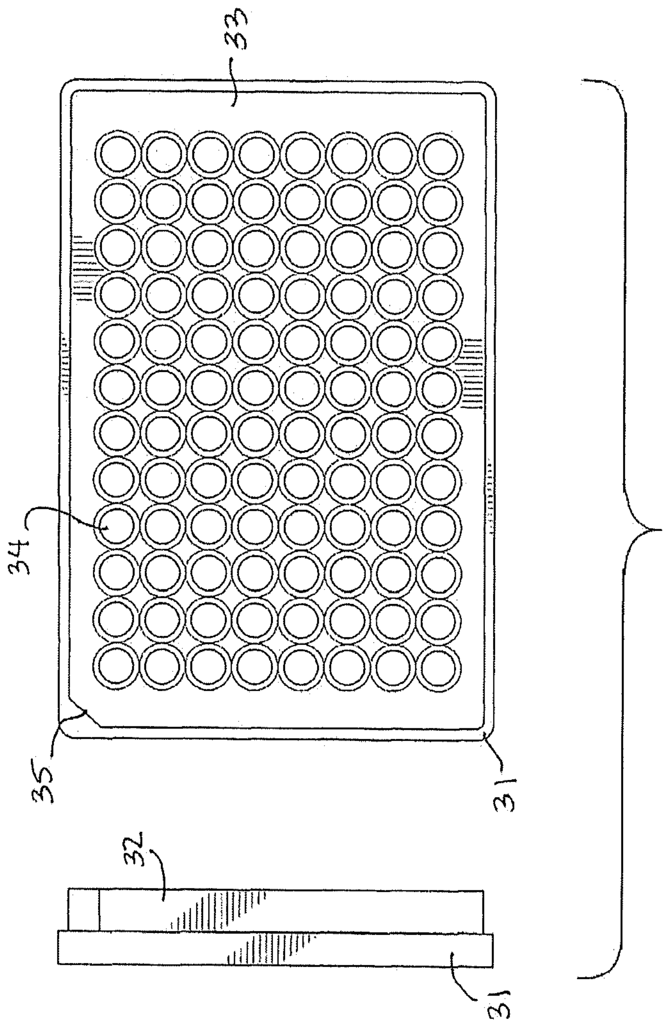
FIG. 2 is a combination of top plan and side elevational views of a microtiter plate of FIG. 1.

FIG. 2 illustrates the plate 30 in top plan and side elevation views. FIG. 2 illustrates the same components as FIG. 1 with the addition of the truncated corner 35 which is frequently added for the purpose of orienting the wells in a robotic environment.

Figure 3:
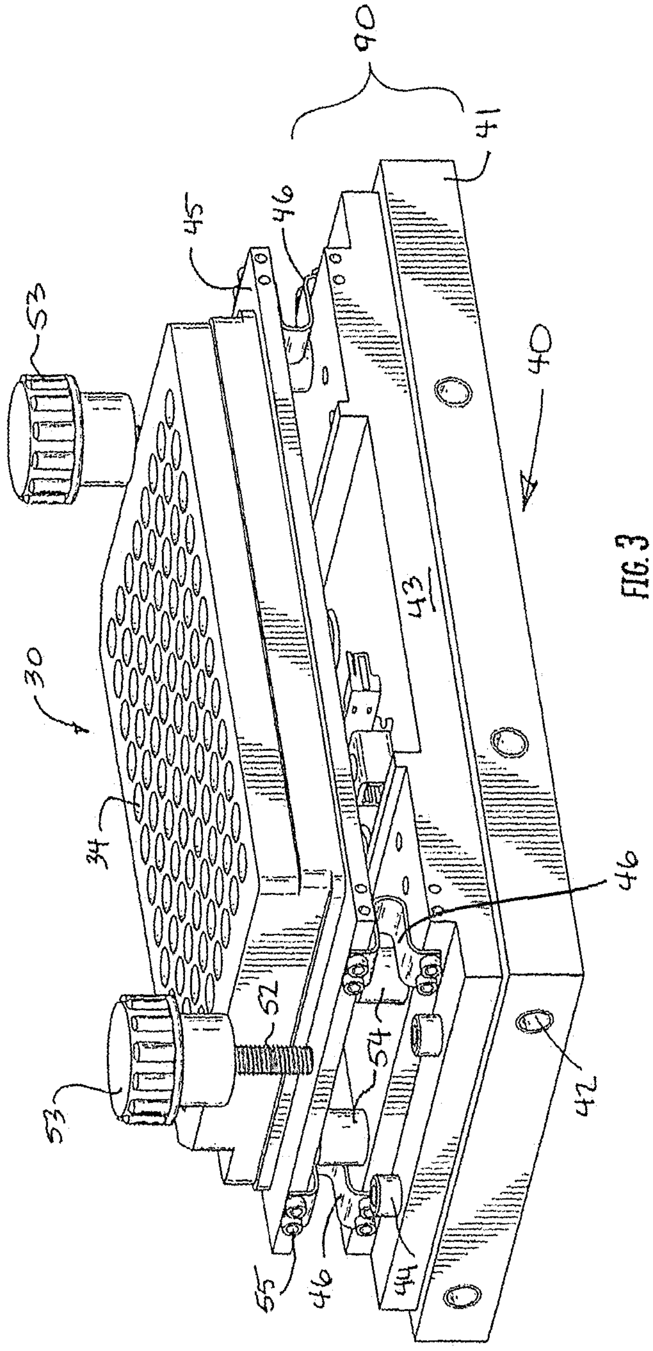
FIG. 3 is a perspective view of a mixing control system according to the present invention.

FIG. 3 illustrates a plate 30 and it's wells 34 in position on a first embodiment of the invention; i.e., the mixing control system broadly designated at 40. In this embodiment, the mixing control system 40 is mounted on frame 90. The baseplate optionally carries a plurality of mounting holes 42 so that the baseplate can be positioned (fixed in place) for some other purpose, including incorporation into an overall automation system.

In the illustrated embodiment, a spring (or suspension) support plate 43 is fixed to the baseplate 41 using a plurality of frame bolts 44. A magnetically responsive vertically moveable horizontal platform illustrated as the plate 45 is supported (suspended) on the support plate 43 and the baseplate 41 by a plurality of springs 46. The use of one or more springs (four are illustrated) define a spring suspension system 91, which helps limit the motion of the plate 45 to one axis; i.e., vertical. In one embodiment the plate 45 is constructed from ferromagnetic material that serves as part of the electromagnetic circuit. Alternatively, plate 45 can be constructed with a combination of ferromagnetic and non-magnetic materials to simplify the construction of the overall system.

A solenoid 47 (FIGS. 5 and 6) is positioned adjacent the plate 45 for moving the plate 45 on the springs 46. A proximity sensor 50 is also adjacent the moveable plate 45 for determining the position of the plate 45 with respect to the remainder of the frame 90; i.e. the spring support plate 43 and the baseplate 41. A controller 51 (FIG. 7) is in communication with the proximity sensor 50 and the solenoid 47 for driving the solenoid 47 and moving the plate 45 in response to the proximity sensor 50.

The proximity sensor is generally an inductive sensor; i.e., an electronic sensor that uses an inductive loop or its equivalent to detect metallic objects without touching them. The operation and structure of such sensors is generally well understood in the art and will not be described in detail herein.

Other types of position or proximity sensors can be incorporated as alternatives or equivalents provided they do not otherwise interfere with the remainder of the structure or intended operation of the instrument. Examples include (but are not limited to) capacitive transducers, capacitive displacement sensors, eddy-current sensors, and potentiometers.

The embodiment illustrated in FIG. 3 includes a pair of mounting bolts 52 with respective mounting knobs 53 that are used to clamp the microtiter plate 30 in position on the moveable plate 45 so that the movement of the plate 30, and thus the contents of the wells 34, are the same as the movement of the plate 45. Several bumpers 54 are positioned underneath the plate 45 to prevent unreasonable amounts of movement in unexpected or uncontrollable circumstances.

FIG. 3 illustrates springs 46 that are U-shaped and fixed to both the support plate 43 and the moveable plate 45 by a plurality of spring fasteners 55. The type of spring illustrated is exemplary rather than limiting, however, and any suspension system that will support the resonant motion described herein will be acceptable in this context.

Figure 4:
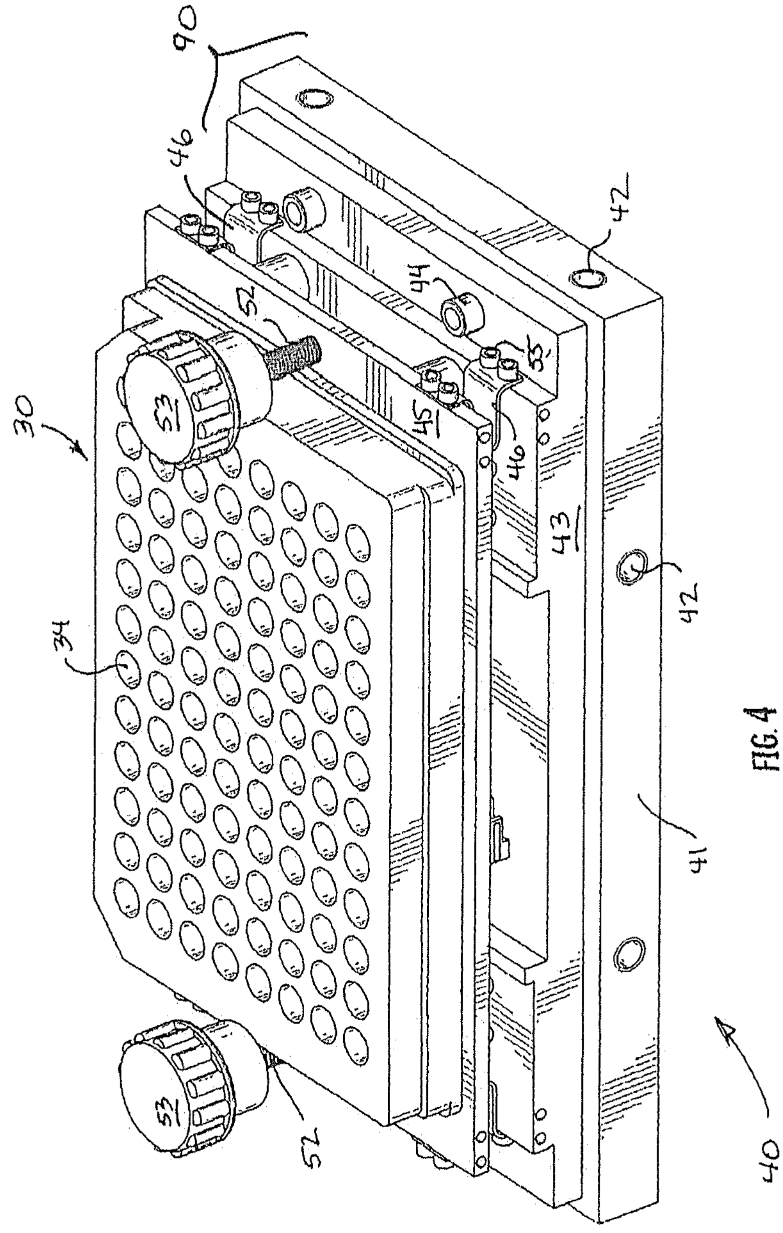
FIG. 4 is a second perspective view of the mixing control system of the present invention.

FIG. 4 is a second perspective view of the embodiment illustrated in FIG. 3.

Figure 5:
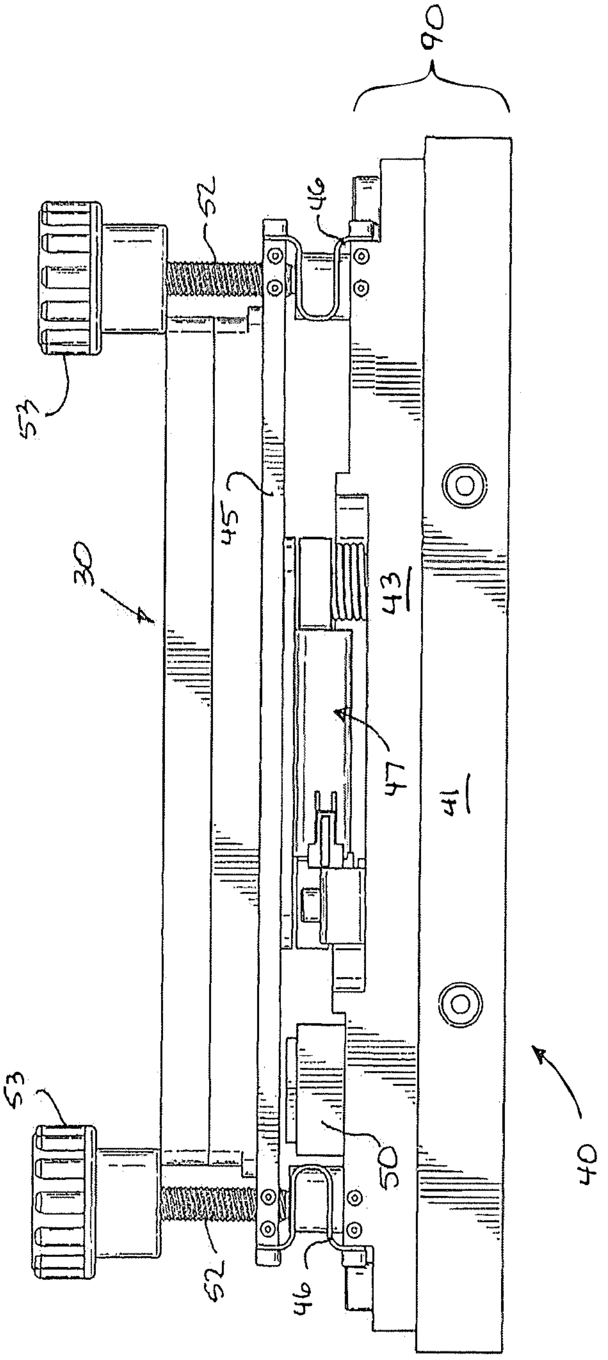
FIG. 5 is a side elevational view of a mixing control system according to the invention.

FIG. 5 is a side elevational view of the embodiment of the mixing control system 40 illustrated in FIGS. 3 and 4. FIG. 5 helps illustrate an appropriate position (exemplary but not limiting) of the proximity sensor 50 and the solenoid 47.

Figure 6:
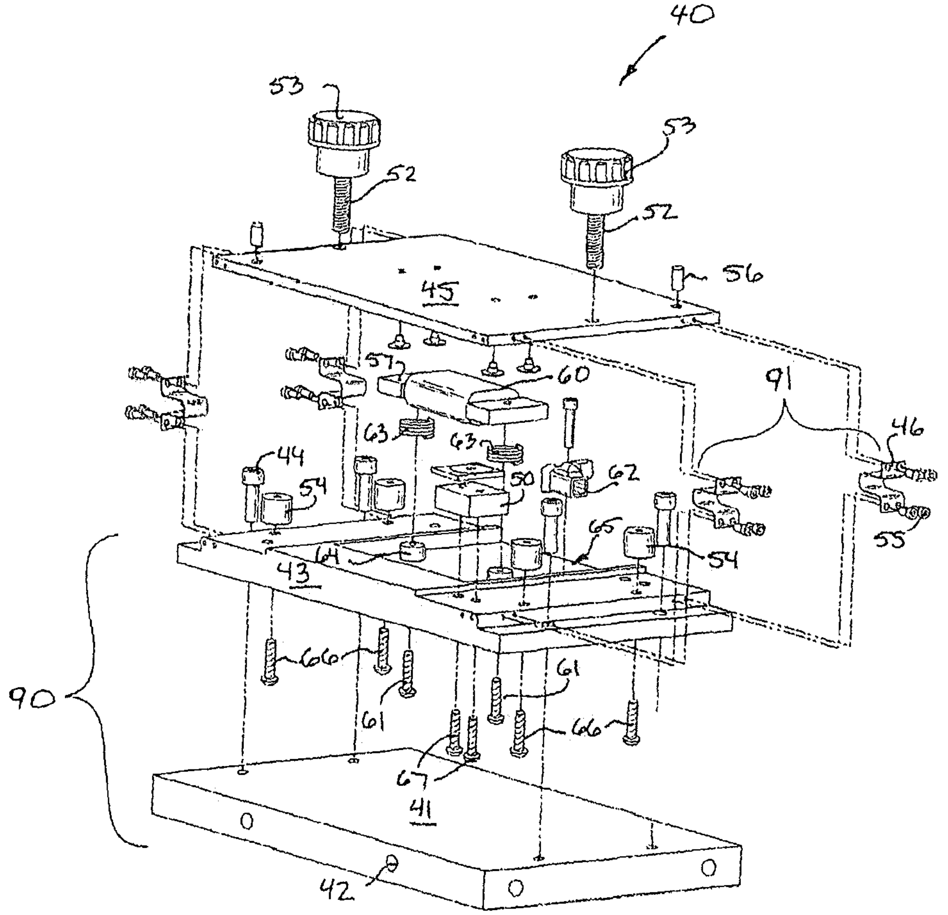
FIG. 6 is an exploded perspective view of the mixing control system illustrated in FIG. 3-5.

FIG. 6 is an exploded view of the mixing control system illustrated in FIGS. 3-5. Most of the items illustrated and referenced in FIGS. 3-5 are illustrated in FIG. 6, with the main items helpful for orientation of the view being the baseplate 41, the suspension support plate 43, and the moveable plate 45.

Perhaps most helpfully, FIG. 6 illustrates the solenoid illustrated as the stator 57, and the winding 60. The operation of a solenoid is well understood in the art, and in the current context, the stator 57 and the winding 60 generate the magnetic field that will move the plate 45 on the springs 46. The stator 57 is attached to the spring support plate 43 with a plurality of stator bolts 61. The stator 57 rests on a pair of springs 63 that are placed on the spring posts 64 with the stator bolts 61 securing the stator 57 to the solenoid springs 63 and the spring posts 64.

A female connector 62 is the only portion of the network and electrical connections illustrated in FIG. 6, but such items are straightforward and well understood in the art, and for the sake of clarity are not specifically illustrated in FIG. 6. As a few additional details, FIG. 6 helps illustrate that the support plate 43 includes a solenoid channel 65 that helps with the vertical positioning of the related components. The illustrated bumper bolts 66 secure the bumpers 54 in position on the support plate 43. In a similar arrangement, the sensor bolts 67 secure the proximity sensor 50 in position on the support plate 43.

Figure 7:
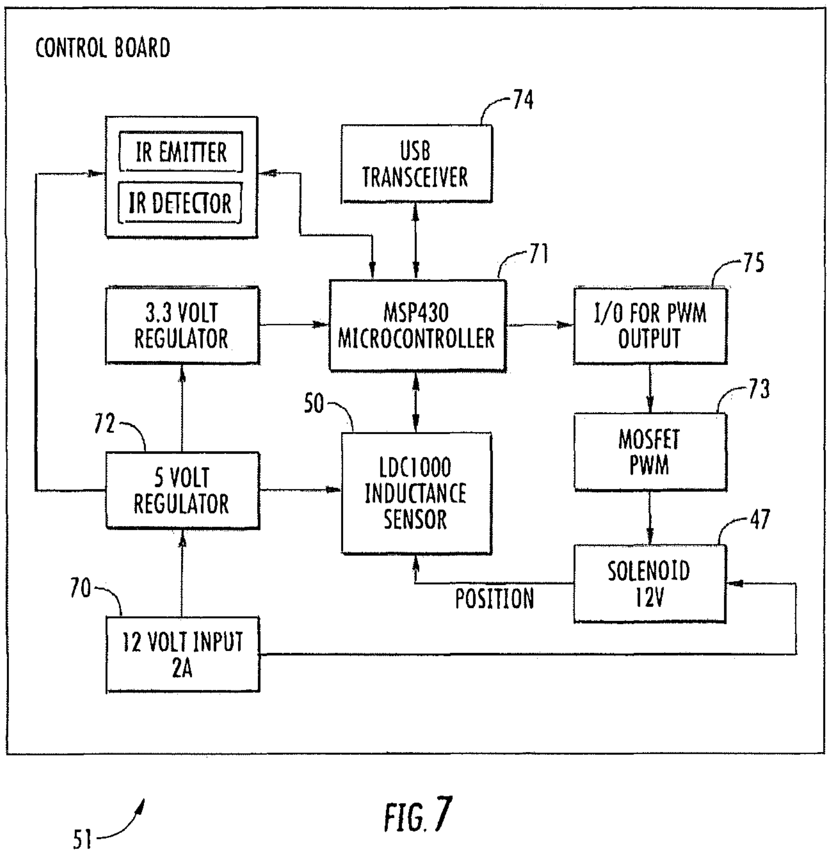
FIG. 7 is a schematic flow diagram of the controller for the mixing system of the invention.

FIG. 7 is a flowchart illustrating the relationship among the parts of the controller that are in communication with the proximity sensor 50 and with the solenoid 47 for driving the solenoid and moving the plate 45 in response to the proximity sensor.

FIG. 7 illustrates system control using a microcontroller 71. Any controller that can provide the appropriate memory, speed, logic and input/output (I/O) for the task will be appropriate, and the illustrated MSP430 controller is one of a well understood family of such processors widely available from (for example) Texas Instruments.

A first regulator 72 is connected to the power input 70, and a second regulator 76 is in series between the first regulator 72 and the controller 71. The power input 70 is also in communication with the solenoid 47 with an appropriate transistor—in this case a pulse width modulating MOSFET 73—being incorporated in accordance with the method described herein.

As FIG. 7 further illustrates, the induction proximity sensor 50 is in communication with the microcontroller 71. If desired, the controller 51 can include a transceiver illustrated as the USB transceiver 74 for conveniently providing communication (e.g., wired, Ethernet, Wi-Fi) between the controller 51 and an external device or host.

The microcontroller 71 signals an input output ("I/O") device 75 which in turn generates the signal to the MOSFET 73 to provide the pulse width modulated signal to the solenoid 47, and thereby moving the resonant plate appropriately.

Figure 8:
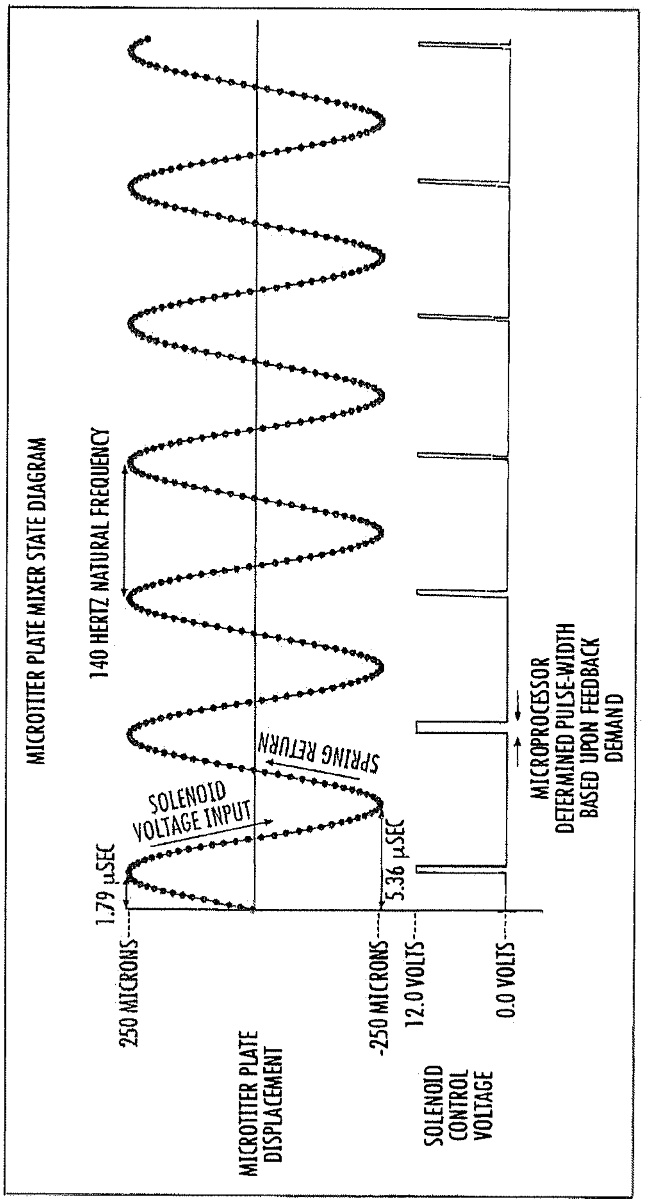
FIG. 8 is a state diagram representing the motion of the microtiter plate in relation to applied voltage.

FIG. 8 is a state diagram for the microtiter plate mixing system of the invention. The top portion of the plot in FIG. 8 shows the desired frequency for the microtiter plate along the horizontal axis, and the displacement of the microtiter plate (in microns) on the vertical axis. The corresponding solenoid control voltage is plotted beneath the frequency and illustrates that by applying appropriately pulsed signals, the movement of the plate can be carefully controlled even at relatively high frequencies and very small displacements. As illustrated in FIG. 8, the solenoid voltage is applied to move the suspended plate 45 towards the solenoid (typically downwardly) and the force applied by the springs 46 returns the plate 45 in the opposite direction (typically upward) during the resonant motion.

Figure 9:
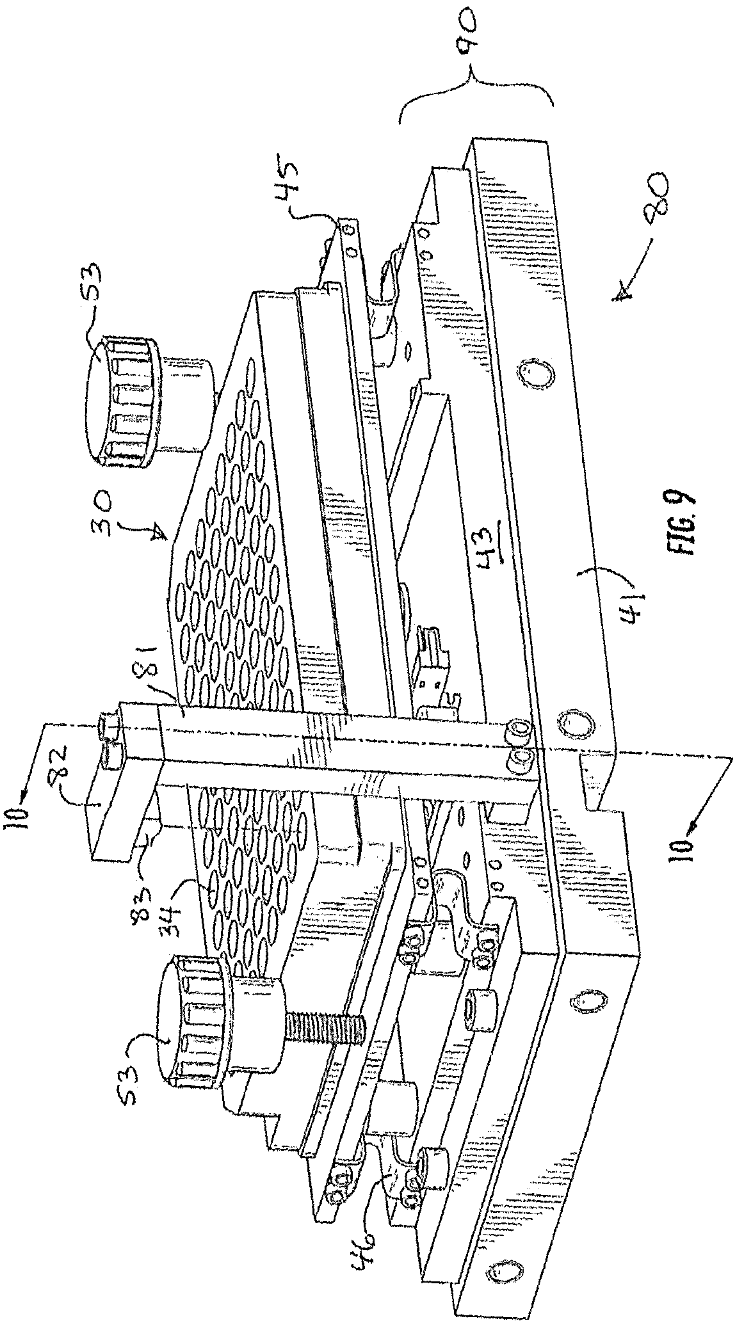
FIG. 9 is a perspective view of another embodiment of the mixing control system.
Figure 10:
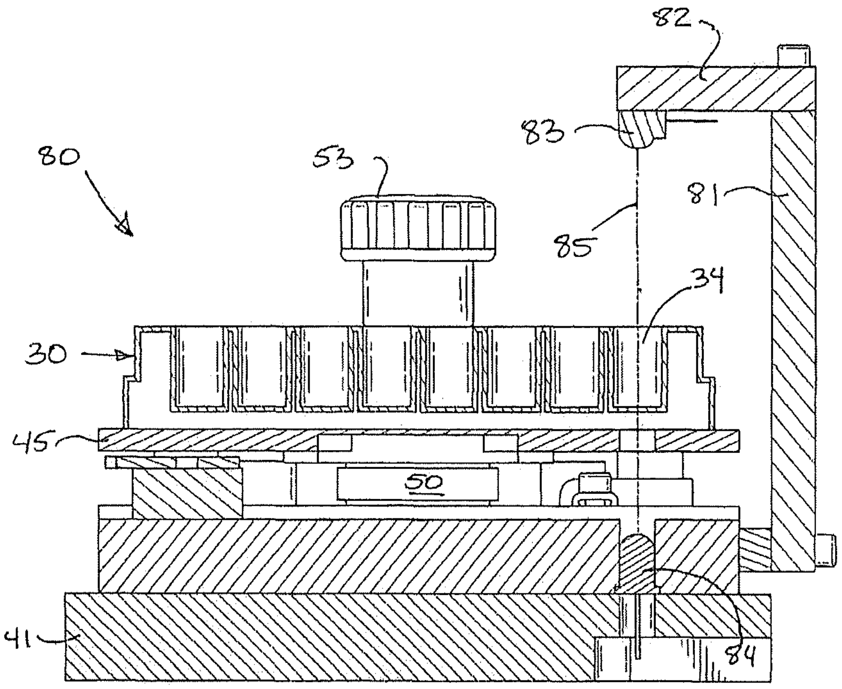
FIG. 10 is a cross sectional view taken along lines 10-10 of FIG. 9.

FIGS. 9 and 10 illustrate a second embodiment of the invention broadly designated at 80. FIG. 9 is a perspective view similar to FIG. 3, and the same elements carry the same reference numerals. Thus, FIG. 9 illustrates the microtiter plate 30 and its wells 34 on the resonant plate 45 above the base plate 41. The resonant plate 45 is again supported on the springs 46, and the microtiter plate 30 is clamped in place by the mounting knobs 53.

This embodiment, however, also includes an optical source 84 and an optical sensor (detector) 83 that is responsive to the source; i.e., the source will detect the output (wavelength or frequency) produced by the source. Together the source and the detector define an optical path that includes at least one plate well when a microtiter plate is on the magnetically responsive horizontal platform 45. The optical detector is also in communication with the controller for providing the controller with information based upon the well's effect—and in particular the effect of the contents in the well—on optical transmissions between the optical source and detector along the defined optical path.

In the embodiment illustrated in FIGS. 9 and 10, an upright post 81 carries a horizontal arm 82 that positions an optical detector 83 above one of the wells 34 on the microtiter plate 30. The cross-sectional view of FIG. 10 further clarifies the relationship of the elements. FIG. 10 shows the optical source as a light emitting diode (LED)

package 84. As those familiar with the art are well aware, the LED itself is a small semiconductor structure. For purposes of convenience when used with certain types of components, the LED can be packaged in a polymer lens and on a conductive support.

In exemplary embodiments, the LED 84 and the detector 83 operate in the infrared ("IR") frequencies. The IR frequencies have several advantages in the context of the invention. First, ambient light will not interfere with the optical transmission or measurement. Second, infrared devices are well understood and widely available at generally modest cost. Third, the necessary electronics are minimal, which in the context of the invention avoids generating excess heat from the electronics which in turn could affect the sophisticated temperature conditions or measurements of the reactions in the wells 34 in the plate 30. The exact borders (frequency or wavelengths) that define the infrared portion of the electromagnetic spectrum are subjective, but 3-30 μm is often used descriptively. Other frequencies can, of course, be included in the infrared spectrum by opinion or designation (e.g., "near infrared" as 800 nm to 3 μm and "far infrared" as 30 μm to 1 mm). Although the invention finds the infrared frequencies useful, the source and the detector are not limited to these frequencies.

In general, a detector with a relatively fast response (e.g., a speed of response at least about double the fastest response frequency of the system) is helpful, because it provides the relevant information as closely as possible to real-time. If a real-time measurement is less important, however, a detector with a slower response is entirely appropriate.

In FIG. 10, the optical path is illustrated as the dotted vertical line 85. The optical path 85 includes, and as illustrated passes through, one of the plate wells 34. Thus, FIG. 10 illustrates a transmission optical path through the well 34. Nevertheless, it will be understood that a reflective path can be used as an alternative, and infrared sources and detectors that operate using reflection are likewise straightforward, well understood, and readily available. Additionally, the particular positioning of the LED 84 and the detector 83 can be reversed or even positioned in some other orientation provided that the path includes at least one plate well 34 in some fashion.

Figure 11:
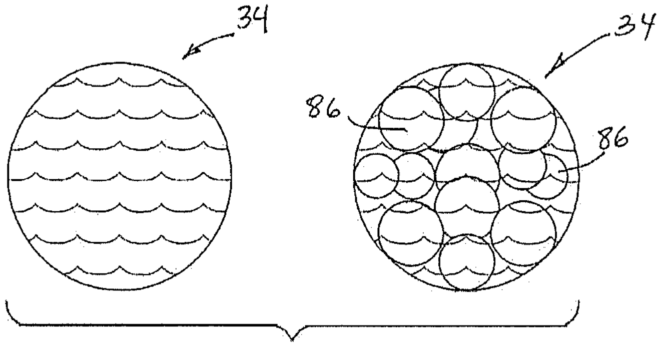
FIG. 11 is a schematic diagram of the contents of a microtiter plate well in two different states.

FIG. 11 is a schematic diagram of a plate well 34 taken from a top plan perspective showing the difference between contents that are at rest and contents that are being mixed. When a well is empty or the contents of a well 34 are at rest, the transmission along the optical path 85 between the source 84 and the detector 83 will be relatively high. Alternatively (e.g., the right-hand portion of FIG. 11), when proper mixing is taking place, the contents of the well 34 will be turbulent, illustrated in FIG. 11 by the bubbles 86. This turbulence interferes much more with the optical path 85, and measurably lowers the transmission between the source 84 and the detector 83. As a result, the existence (and in some cases the amount) of turbulence can be tracked using the source 84 and the detector 83.

Figure 12:
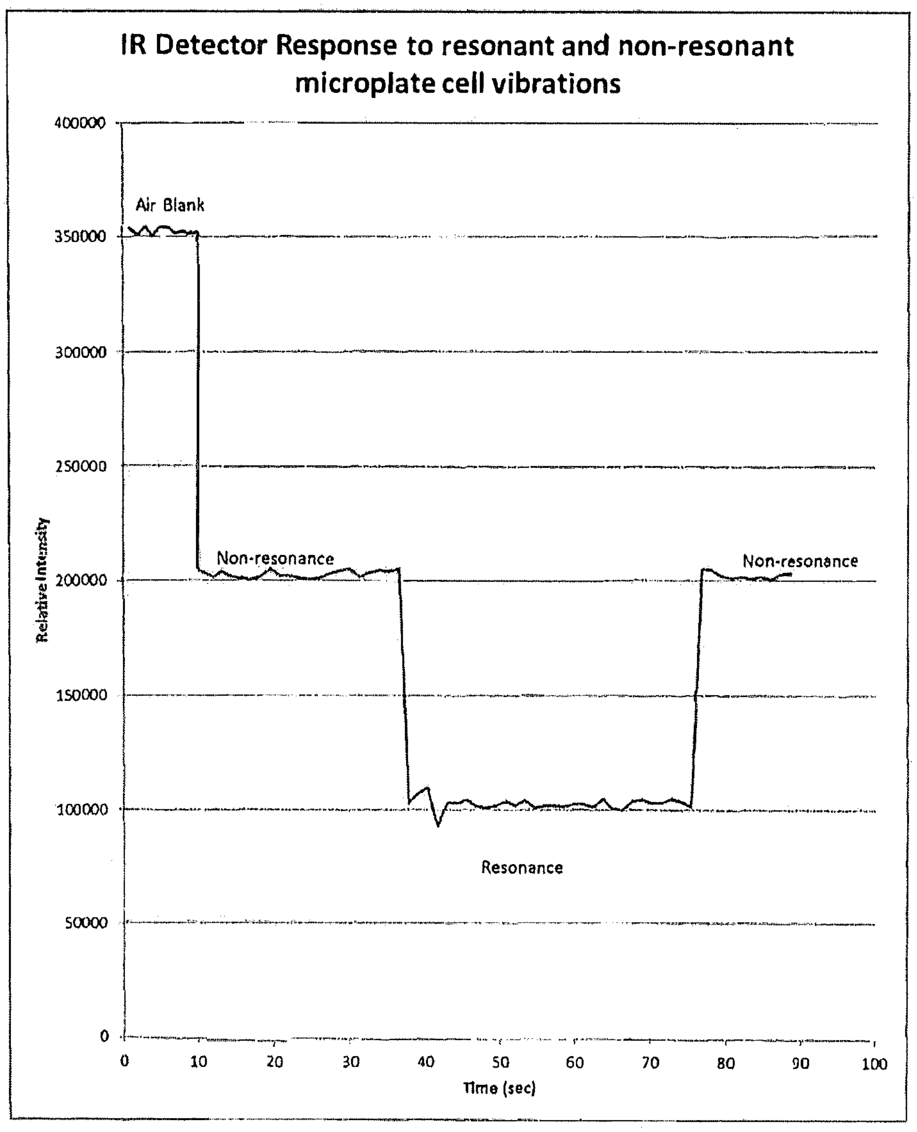
FIG. 12 is a plot of the output of an optical detector associated with the mixing control system.

FIG. 12 is a plot of one such method of tracking the turbulence. FIG. 12 shows the detector response expressed as the relative intensity of frequency in hertz, plotted against time, for an optical path positioned and used according to the invention. From 0-10 seconds the path covers an air blank for reference purposes, and which as expected demonstrates the most transmission. From 10 to about 40 seconds (and later at about 75 seconds), the transmission is based upon a well and its contents moving at a non-resonant frequency. From about 40 to about 75 seconds, the microtiter plate (and thus the well and its contents) are moving at a resonant or near resonant frequency. As expected, and as desired, the properly resonant mixing conditions demonstrate the least transmission. Because of the difference in physical properties between the well and the liquid in the well, disruption or mixing of the fluid occurs.

This optically-based information can be transmitted from the optical detector in communication with the controller to provide the controller with the relevant information based upon the well's effect on the optical transmission along the defined optical path; i.e., the source and detector can provide the controller with useful information about the state of mixing in the wells 34. This mixing information can in turn be used to modulate the drive of the solenoid in a desired amount in response to the information from the optical detector.

As set forth previously herein, the use of a frequency that is resonant or near-resonant with the natural resonant of the system (here, the resonant plate 45, the springs 46, and the plate 30 and its contents) provides the most efficient use of energy. Indeed, in some circumstances, operating the resonant plate 45 and the microtiter plate 30 at a frequency near the natural resonant reduces the energy required to drive the system by one or more orders of magnitude.

In another aspect, the invention is a method of mixing compositions in small volumes of liquids. In this aspect, the method comprises driving the resonant motion of a horizontally oriented, moveably mounted microtiter plate in the vertical axis in response to the inductively measured position of the plate. In particular, the vertical motion is driven at a frequency near the natural resonant frequency of the mounted microtiter plate.

In stepwise fashion, the method includes positioning a microtiter plate containing the compositions to be mixed on a suspension mounted horizontal magnetically responsive platform. Resonant motion of the horizontal platform on the suspension system 91 (springs are illustrated) is then initiated and the vertical position of the platform is measured as the platform moves. The plate is then proactively driven (i.e., by the solenoid) in response to the measured vertical position.

In carrying out the method, the structural aspects of the invention incorporate a suspension or flexure system 91; e.g., the springs 46. As is generally well understood in basic physics, a mass connected to a spring will define a natural resonant frequency that is based upon the mass that is connected to the spring, gravity, the spring constant, and the spring's initial displacement. Driving the mass at the resonant frequency in concert with precise control of the amplitude in turn gives accurate mixing control unavailable in other systems to date.

In this regard, the induction proximity sensor (e.g., 50 in the figures) also measures the position of the resonant plate 45 before resonant motion is initiated. This position is a function of the weight of the microtiter plate 30 and its contents. As a result, the proximity sensor 50 provides information about the initial mass (i.e., the microtiter plate 30 and its contents) as well as accurate feedback control of the microtiter plate's movement. When the initial mass is known, the effect of the change in the mass (the plate) on the natural frequency can be calculated and used to precisely control (using the solenoid) the resonant motion of the resonant plate 45 and thus of the microtiter plate 30 and thus of the compositions in the wells 34. Inductive sensor feedback allows quick and accurate determination of the resonant frequency after the detection of the first resonant wave.

Stated differently, an empty microtiter plate suspended on the moveable plate 45 and the springs 46 has one natural resonant frequency, but adding compositions (usually including liquids) to any one or more of the wells 34 will in turn change the overall mass and thus change the overall resonant frequency. Although this could potentially be problematic, the incorporation of the induction proximity sensor 50 combined with the knowledge of the effective mass of the system (based upon the initial measurement of the system at rest) provides absolute control over the resonant motion of the instrument.

As set forth previously, accurate, repeatable chemical reactions require precise control of all phases of the chemical reaction. Although this is usually understood in terms of the concentrations of reactants, the temperature, and similar factors, in reactions that incorporate multiple reactions in the many wells of a microtiter plate, any mixing step essentially adds another variable to the reaction parameters. To the extent this variable can be controlled, or its differences eliminated from reaction to reaction and plate to plate, the relevant reactions can be correspondingly controlled and understood.

In both the method and apparatus aspects of the invention, the mechanism—e.g., the illustrated suspended plate 45—is supported by the suspension system 91 (e.g., springs 46) which is selected to permit resonant oscillation at (or near) the specified frequency of 140 Hz.

With this capability, the controller initiates a force on the mechanism so that the resonant plate 45 begins to oscillate at the natural frequency of the particular system. As this natural initial oscillation begins, the inductive proximity sensor 50 determines the position and adjusts the force input using the solenoid 47. The solenoid 47 is driven using pulse width modulation via the microcontroller 71 and the MOSFET 73 to produce a desired vertical displacement at the intended 140 Hz frequency or as a frequency follower.

Pulse width modulation (PWM) is a technique used in many applications, and is well-understood by those of ordinary skill in this and many other arts, and accordingly will not be discussed in detail herein. Described generally, pulse width modulation is a technique for controlling analog circuits using the digital output of a microcontroller. In PWM, the duty cycle of a square wave is modulated to encode a specific analog signal level.

In the invention, the resonant movement of the microtiter plate 30 is essentially analog in nature, but the invention controls it digitally using pulse width modulation. By digitally controlling the pulse width applied to the solenoid 47, the invention precisely controls the analog motion of the suspended plate 45, and thus controls the motion of the microtiter plate 30.

As an additional advantage, because the microcontroller 71 can record the oscillation pattern (frequency, number of oscillations, displacement), critical information can be developed and recorded for optimizing and repeating the specific mixing needs of particular chemical reactions.

In another embodiment the invention is a method of mixing compositions in small volumes of liquids that includes the steps of positioning the microtiter plate containing the compositions to be mixed on the suspension (spring) mounted horizontal platform, initiating resonant motion of the horizontal platform in the vertical axis on the suspension system 91; measuring the optical turbulence of the composition in and at least one well in the microtiter plate; and driving the vertical motion of the plate on the suspension system 91 in response to the optical turbulence. The use of the optical source and detector can be carried out independently of the measurement of the vertical position of the platform, or concurrently with the measurement of the vertical position of the platform.

Relevant testing indicates that a sample can be mixed thoroughly in between about 30 seconds and several minutes under these conditions.

The system avoids exceeding acceptable laboratory sound levels; will operate in a laboratory environment; holds a standard microtiter plate; operates under relevant global alternating current power sources; is CE (Conformité Européenne) compliant and optionally can be operated by remote control using appropriate wireless transceivers or physical electrical connections (e.g., USB) for Wi-Fi® or Bluetooth®.

Timing circuits are generally well understood in the art and can be applied to the system as can an appropriate timing function to provide continuous or pulsed operation for a specific duration. Additional benefits are achieved by incorporating mixed timing control patterns which allow for sweeping frequency and/or displacement to achieve an additional disruption to the sample mixing.

In another aspect, the method comprises fixing the microtiter plate (with the compositions in the wells) on the suspension mounted horizontal platform in a manner that keeps the vertical motion of the plate and the horizontal platform congruent with one another. Stated differently, if the microtiter plate is fixed properly its motion will be congruent with that of the horizontal platform. Alternatively, however, if for some reason the connection or relationship between the microtiter plate and the horizontal platform allows for some degree of secondary movement, even if very small, the possibility exists—and in some cases is quite likely—that a secondary harmonic will be set up in the liquid in the cells that is different from the intended harmonic defined by the movement of the horizontal platform.

Such different harmonic motions (i.e., as between the microtiter plate and the instrument) can be significant in the context of the sophisticated reactions being carried out in the small volumes of the microtiter plate wells. These variations among and between wells may affect both the mixing and the chemical reaction results in an unintended manner. Again, one of the goals of the invention and the corresponding problem to be solved is to reduce or eliminate unwanted variables—even variations in mixing—among and between otherwise similar reactions in otherwise similar wells so that the reactions can be accurately observed in terms of those variables that are intentionally different.

In that regard, the method also includes the steps of fixing the microtiter plate on the suspension mounted horizontal platform, initiating the vertical resonant motion of the horizontal platform and the fixed microtiter plate on the suspension system 91 and at the same amplitude and frequency. In this aspect, however, the method includes the step of driving the vertical motion of the platform and the plate on the suspension system 91 until the plate reaches resonance, and then relaxing the motion of the platform and the plate until the compositions (i.e., the liquids and other contents) in the wells in the plate are all substantially at rest.

The driving and repeating steps are then repeated until the desired degree of mixing is complete. In this regard, a high-frequency camera has been found to be useful in confirming that the liquids in the cells in the microtiter plate are all at rest.

Furthermore, it has been discovered that the repeated cycles of relaxation to liquid rest followed by a driving pulse to the resonant frequency provides a highly uniform mixing step among and between all of the wells in the microtiter plate. More specifically, it appears that the mixing is more consistent than rotational or ultrasonic vibrations within the same time intervals.

In current embodiments, it is been determined that the mixing is highly uniform when the driving and relaxing steps are fixed intervals, with the relaxation step being longer (more time) then the driving step. In particular, excellent results have been attained when the ratio of the driving step to the relaxation step is between about 1:3 and 1:5 (measured by time) with 1:4 working particularly well from an empirical standpoint.

This can also be expressed as a step of driving the motion of the platform to resonance for an interval of about one second, followed by an interval of relaxation that extends between three and five seconds, with four seconds of relaxation for every second of pulsing to resonance being empirically very satisfactory to date.

In the drawings and specification there has been set forth preferred or exemplary embodiments of the invention, and although specific terms have been employed, they are used in a generic and descriptive sense only and not for purposes of limitation, the scope of the invention being defined in the claims.

The invention claimed is:

1. A method of mixing compositions in small volumes of liquids with precise control, the method comprising:

positioning a microtiter plate containing compositions to be mixed on a magnetically responsive horizontal platform, the magnetically responsive horizontal platform mounted to a spring suspension system;

oscillating the magnetically responsive horizontal platform along a vertical axis defined by one or more springs of the spring suspension system, the oscillating driven by a solenoid;

measuring a vertical position of the magnetically responsive horizontal platform as the magnetically responsive horizontal platform moves along the vertical axis defined by one or more springs of the spring suspension system, the vertical position of the magnetically responsive horizontal platform measured by a proximity sensor positioned adjacent the magnetically responsive horizontal platform;

transmitting the vertical position to a microcontroller in communication with and between the solenoid and the proximity sensor, the microcontroller programmed with logic for driving the oscillating of the magnetically responsive horizontal platform in response to the proximity sensor via the solenoid; and driving the solenoid in response to the vertical position to cause the magnetically responsive horizontal platform to oscillate along the vertical axis defined by one or more springs of the spring suspension system.

2. The mixing method of claim 1 further comprising the step of measuring the vertical position of the magnetically responsive horizontal platform after positioning the microtiter plate but before oscillating the magnetically responsive horizontal platform along the vertical axis to determine an initial vertical position.

3. The mixing method of claim 1 further comprising the step of measuring a weight of the microtiter plate containing compositions to be mixed after positioning the microtiter plate containing compositions to be mixed but before oscillating the magnetically responsive horizontal platform along the vertical axis.

4. The mixing method of claim 1 wherein driving the solenoid generates a magnetic field to oscillate the magnetically responsive horizontal platform along the vertical axis defined by one or more springs of the spring suspension system.

5. The mixing method of claim 1 comprising driving the solenoid by pulse width modulation, wherein the solenoid is in communication with and between the microcontroller and a transistor configured to provide a pulse width modulation signal to the solenoid.

6. The mixing method of claim 1 further comprising:

measuring an optical turbulence of the compositions in at least one well in the microtiter plate to determine an optical turbulence measurement, the optical turbulence measured along an optical transmission path defined by an emitting source and an emitting source detector positioned to create the optical transmission path through at least one well of the microtiter plate; and driving the solenoid in response to the optical turbulence measurement to generate a magnetic field to displace the magnetically responsive horizontal platform along the vertical axis and to oscillate the magnetically responsive horizontal platform along the vertical axis.

7. The mixing method of claim 6 further comprising modulating a driving frequency of the solenoid in response to the optical turbulence measurement in at least one well in the microtiter plate.

8. The mixing method of claim 1 comprising modulating a drive frequency of the solenoid for driving across the oscillating of the magnetically responsive horizontal platform moving the magnetically responsive horizontal platform in and out of a resonant motion.

9. The mixing method of claim 8 comprising modulating an amplitude displacement of the magnetically responsive horizontal platform to disrupt the resonant motion of the magnetically responsive horizontal platform.

10. The mixing method of claim 9 comprising modulating the amplitude displacement of the magnetically responsive horizontal platform in response to an optical turbulence measurement in at least one well in the microtiter plate, the optical turbulence measured along an optical transmission path defined by an emitting source and an emitting source detector positioned to create the optical transmission path through at least one well of the microtiter plate.

11. The mixing method of claim 1 further comprising pausing the f oscillating of the magnetically responsive horizontal plate until the compositions to be mixed are all substantially at rest.

12. The mixing method of claim 11 wherein the driving step and pausing step are performed in fixed time intervals.

13. The mixing method of claim 12 wherein the ratio of the fixed time interval for the driving step to the pausing step is between 1:3 and 1:5.

* * * * *